… …

United States Patent [19]

Chen

[11] Patent Number: 5,465,634
[45] Date of Patent: Nov. 14, 1995

[54] HANDLEBAR ASSEMBLY FOR CYCLES

[76] Inventor: Chin-pei Chen, No. 198 Feng-Chou Rd., Shen-Kang Hsiang, Taichung, Taiwan

[21] Appl. No.: 212,845

[22] Filed: Mar. 15, 1994

[51] Int. Cl.⁶ ................................................. G05G 1/14
[52] U.S. Cl. .................. 74/551.3; 74/551.1; 74/551.4; 280/279; 403/71; 403/82
[58] Field of Search ....................... 74/551.1–551.7; 280/279; 403/69, 70, 71, 82, 84, 91, 96, 102, 103

[56] References Cited

U.S. PATENT DOCUMENTS

| | | | |
|---|---|---|---|
| 1,578,634 | 3/1926 | Borgmann | 403/71 |
| 4,568,121 | 2/1986 | Kashima | 403/82 X |
| 4,896,559 | 1/1990 | Marier et al. | 280/279 X |
| 5,331,865 | 7/1994 | Oskam | 74/551.4 X |
| 5,373,757 | 12/1994 | Bigall | 74/551.3 |

FOREIGN PATENT DOCUMENTS

| | | | |
|---|---|---|---|
| 510721 | 5/1952 | Belgium | 74/551.3 |
| 454393 | 1/1950 | Italy | 74/551.3 |
| 4-27685 | 1/1992 | Japan | 74/551.3 |
| 122626 | 8/1948 | Sweden | 74/551.1 |

Primary Examiner—Vinh T. Luong
Attorney, Agent, or Firm—Bacon & Thomas

[57] ABSTRACT

A handlebar assembly for a cycle includes a post having a number of teeth formed in the upper end, a wedge engaged with the lower end of the post, a shank having a number of teeth formed in one end for engaging with the teeth of the post, a stub rotatably engaged in the shank, a bolt is threadedly engaged with the stub, engaged through the post and threadedly engaged with the wedge, so that the post can be fixed in the bicycle and the shank can be fixed to the post when the bolt is threaded.

1 Claim, 5 Drawing Sheets

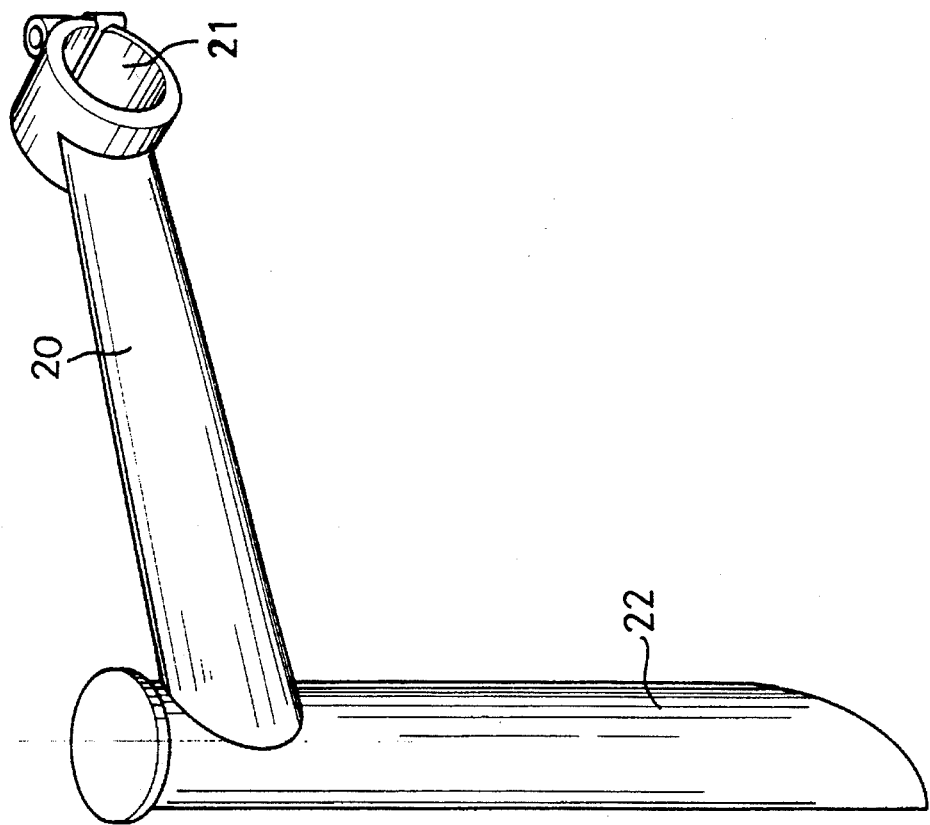
PRIOR APT fig 5

5,465,634

HANDLEBAR ASSEMBLY FOR CYCLES

BACKGROUND OF THE INVENTION

1. Field of the Invention

The present invention relates to a handlebar assembly, and more particularly to a handlebar assembly for cycles.

2. Description of the Prior Art

A prior art handlebar assembly for cycles is disclosed in FIG. 4 and includes a shank 10 having a sleeve 11 provided in the front end for supporting the handlebar and another sleeve 12 provided in the rear end for engaging with a steering tube. The shank 10 can not be adjusted relative to the steering tube. Another prior art handlebar assembly is disclosed in FIG. 5 and includes a shank 20 fixed on a tube 22 which is engaged in the steering tube and having a sleeve 21 provided in the front end for supporting a handlebar, the shank 20 also can not be adjusted relative to the tube 22.

The present invention has arisen to mitigate and/or obviate the afore-described disadvantages of the conventional handlebar assemblies for cycles.

SUMMARY OF THE INVENTION

The primary objective of the present invention is to provide a handlebar assembly for cycles in which the handlebar can be adjusted relative to the steering tube.

In accordance with one aspect of the invention, there is provided a handlebar assembly for a cycle comprising a post for engaging in the cycle, a support provided on top of the post, a shank including a first end for supporting a handlebar stem and including a second end engaged with the support and having an orifice laterally formed therein, a stub rotatably supported in the orifice, and means for securing the stub and the post together so as to fix the shank to the support. The support includes an upper portion having a concave surface formed therein, a plurality of first teeth formed in the concave surface, a plurality of second teeth formed in the second end of the shank for engaging with the first teeth so as to retain the shank in place to the support.

The post includes a bore and includes a bottom end having a first tapered surface, and the securing means includes a wedge having a second tapered surface for engaging with the first tapered surface. A bolt threadedly engages with the stub, the bore and the wedge, whereby, the wedge is moved radially outward to engage with the bicycle so as to fix the post in the bicycle when the bolt is threaded, and the stub and the second end of the shank are fixed to the support. The second end of the shank includes an opening formed therein which intersects with the orifice, and the bolt is engaged with the stub through the opening.

Further objectives and advantages of the present invention will become apparent from a careful reading of a detailed description provided hereinbelow, with appropriate reference to accompanying drawings.

BRIEF DESCRIPTION OF THE DRAWINGS

FIGS. 4 and 5 are schematic views illustrating two prior art handlebar assemblies.

DETAILED DESCRIPTION OF THE PREFERRED EMBODIMENT

Figure 1:
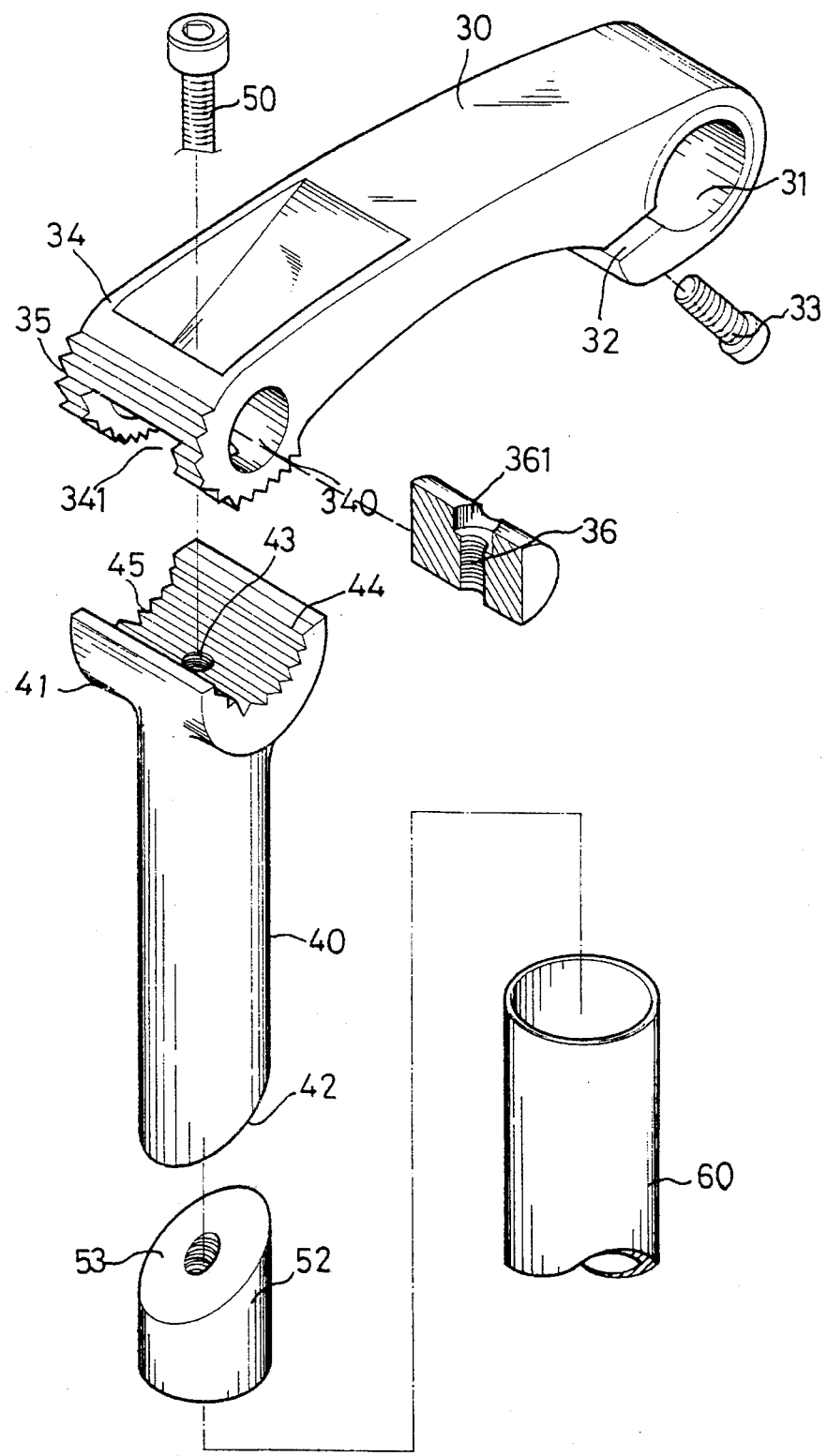
FIG. 1 is an exploded view of a handlebar assembly in accordance with the present invention.
Figure 2:
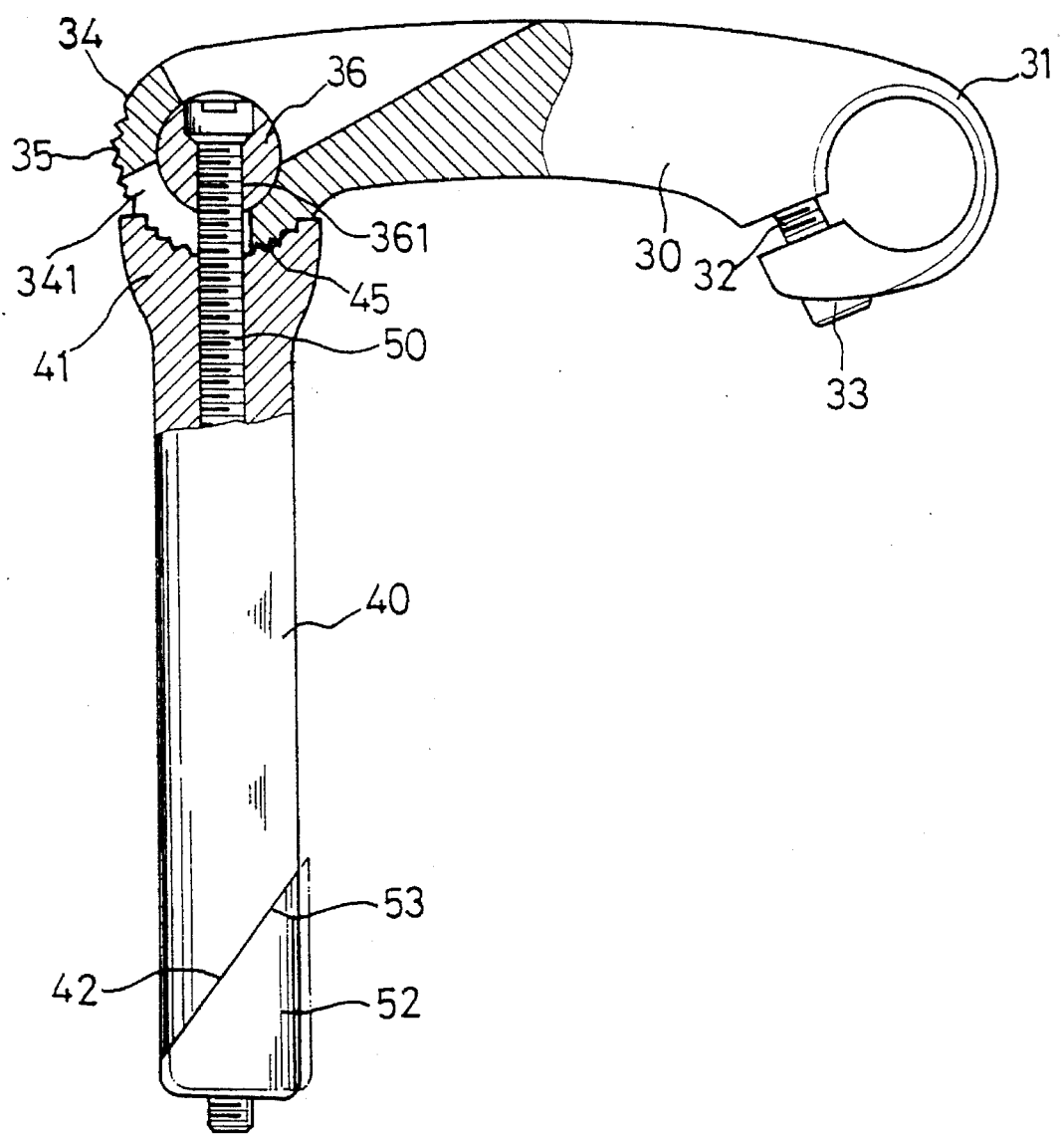
FIGS. 2 and 3 are partial cross sectional views illustrating the operation of the handlebar assembly.
Figure 3:
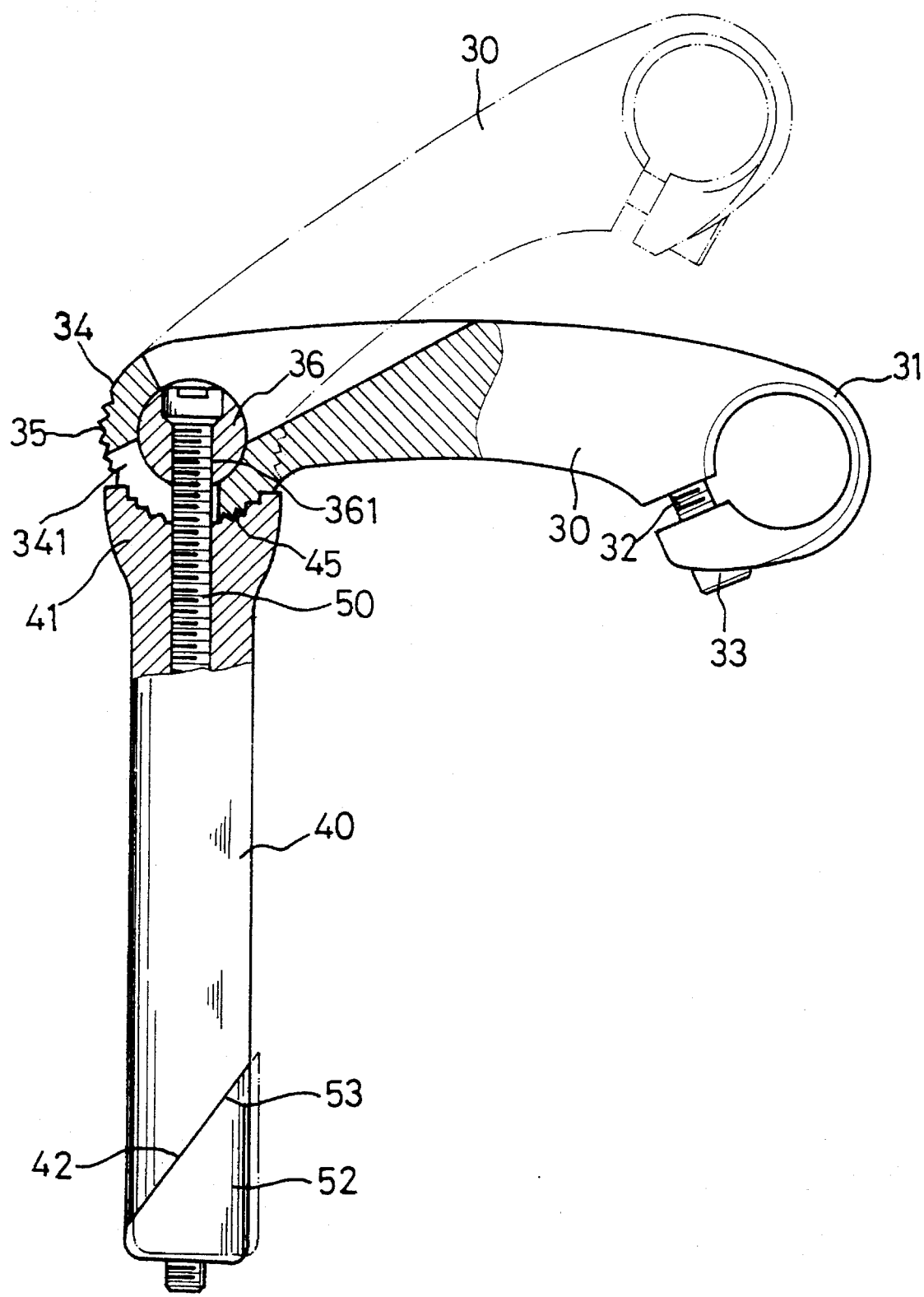
Figure 4:
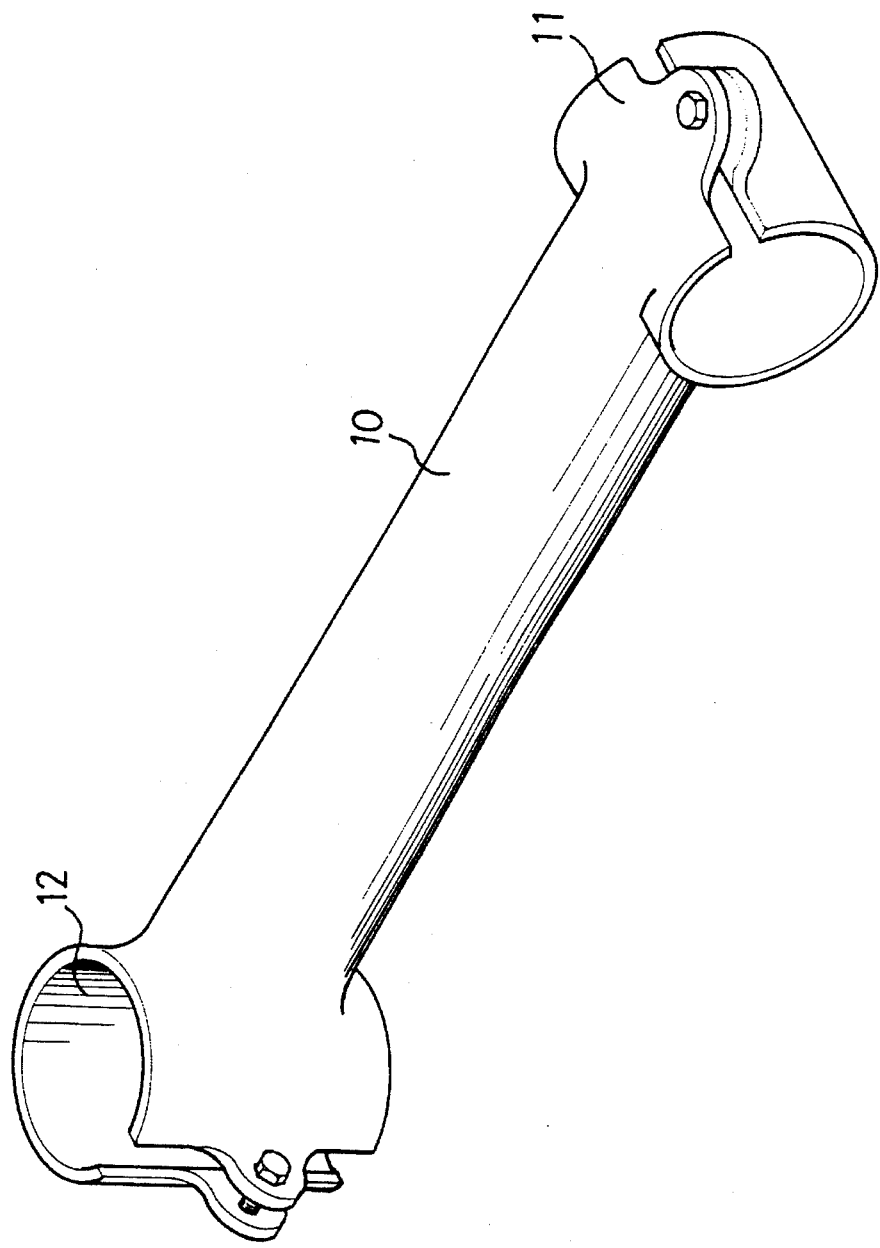

Referring to the drawings, and initially to FIGS. 1 and 2, a handlebar assembly for cycles in accordance with the present invention comprises a post 40 engaged in the steering tube 60 and including a support 41 formed on the upper end and a tapered surface 42 formed in the bottom end, a concave surface 44 formed in the top of the support 41 and having a plurality of teeth 45 formed therein, a bore 43 is formed in the post 40 and extends through the support 41, a wedge 52 including a tapered surface 53 formed in the upper portion is provided for engaging with the tapered surface 42 of the post 40, a shank 30 including one end having a sleeve 31 provided thereon for supporting a handlebar stem, a gap 32 formed in the sleeve 31 and a screw 33 is engaged through the tap 32 for fixing the handlebar stem in place, and another end 34 having a plurality of teeth 35 formed thereon for engaging with the teeth 45 of the support 41, an orifice 340 laterally formed in the other end 34, an opening 341 formed in the end 34 and intersected with the orifice 340, a stub 36 rotatably engaged in the orifice 340 and including a screw hole or threaded passage 361 formed therein, and a bolt 50 engaged with the screw hole 361, engaged through the bore 43 and threadedly engaged with the wedge 52 so as to fix the post 40 and the shank 30 together.

In operation, as shown in FIG. 2, when the bolt is threaded, the wedge 52 can be caused to move radially outward in order to engage with the inner surface of the steering tube 60 such that the post 40 can be solidly secured within the steering tube 60, simultaneously, the end 34 of the shank 30 is fixed to the support 41 by the bolt 50, and the angular position of the shank 30 relative to the post 40 can be solidly retained by the engagement of the teeth 45 and In order to adjust the angular position of the shank 30 relative to the post 40, it is only required to unthread the bolt 50, the shank 30 can thus be adjusted relative to the support 41, and the shank 30 can be solidly fixed to the support 41 when the bolt 50 is threaded again.

Accordingly, the handlebar assembly for cycles in accordance with the present invention includes a shank which can be easily adjusted relative to the post and the steering tube.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A handlebar assembly for attachment to a steering tube of a cycle, the assembly comprising:

a) a post for engaging the steering tube of the cycle, the post including a bore formed therein, a bottom end having a first tapered surface formed thereon, and an upper portion;

b) a support provided on the upper portion of the post, the support including a concave surface formed in the upper portion and a plurality of first teeth formed in the concave surface;

c) a shank including a first end for supporting a handlebar stem and a second end for engagement with the support, the second end including an orifice extending laterally therethrough, an opening formed therein, the opening and orifice intersecting each other, and a plurality of second teeth formed thereon, the first and second teeth being selectively engageable with each other for retaining the shank in a desired position relative to the support;

d) a stub rotatably supported in the orifice and including a threaded passage therethrough;

e) means for securing the stub and the post together, the securing means including a threaded wedge having a second tapered surface for engaging the first tapered surface of the post, and a threaded bolt extending through the threaded passage of the stub, the bore of the shank and the threaded wedge, the bolt being threadedly engaged with both the stub and the wedge; and f) wherein rotation of the threaded bolt causes the threaded wedge to move radially outwardly to secure the assembly to the steering tube and the shank in the desired position relative to the support.

* * * * *